United States Patent [19]

Perry

[11] 4,311,594

[45] * Jan. 19, 1982

[54] MEMBRANE SEPARATION OF ORGANICS FROM AQUEOUS SOLUTIONS

[75] Inventor: Eli Perry, St. Louis, Mo.

[73] Assignee: Monsanto Company, St. Louis, Mo.

[ * ] Notice: The portion of the term of this patent subsequent to Aug. 19, 1997, has been disclaimed.

[21] Appl. No.: 69,957

[22] Filed: Aug. 27, 1979

Related U.S. Application Data

[62] Division of Ser. No. 636,400, Dec. 1, 1975, Pat. No. 4,218,312.

[51] Int. Cl.$^3$ .............................................. B01D 13/00
[52] U.S. Cl. ........................................ 210/640; 55/16; 210/500.2
[58] Field of Search ................ 210/22 A, 22 B, 22 C, 210/23 F, 23 H, 23 R, 321 R, 321 A, 321 B, 500 M, 640; 55/16, 158

[56] References Cited

U.S. PATENT DOCUMENTS

| | | | |
|---|---|---|---|
| 2,953,502 | 9/1960 | Binning et al. | 202/42 |
| 2,981,680 | 4/1961 | Binning | 210/23 H |
| 3,537,988 | 11/1970 | Marcinkowsky et al. | 210/23 H |
| 3,615,024 | 10/1971 | Michaels | 210/490 |
| 3,750,735 | 8/1973 | Chiang et al. | 210/23 H |
| 3,931,000 | 1/1976 | Hamilton | 210/22 |
| 3,950,247 | 4/1976 | Chiang et al. | 210/23 H |
| 3,956,112 | 5/1976 | Lee et al. | 210/22 C |
| 4,218,312 | 8/1980 | Perry | 210/640 |

*Primary Examiner*—Frank A. Spear, Jr.
*Attorney, Agent, or Firm*—Lawrence L. Limpus; Thomas B. Leslie

[57] ABSTRACT

Organics are separated from aqueous solutions by contacting the aqueous solution feed with a first surface of a polymeric membrane selectively permeable to organic components; while maintaining a second and opposite membrane surface at a lower chemical potential than the first membrane surface for said organic components, permeating a portion of the organic components into and through the membrane; and withdrawing from the second membrane surface a mixture having a higher total concentration of organic components than the organic components concentration of the aqueous solution feed stream.

9 Claims, No Drawings

MEMBRANE SEPARATION OF ORGANICS FROM AQUEOUS SOLUTIONS

This is a division of application Ser. No. 636,400, 1 filed Dec. 1, 1975, now U.S. Pat. No. 4,218,312.

BACKGROUND OF THE INVENTION

The invention relates to the membrane separation of organics from aqueous solutions. In another aspect the invention relates to hydrophobic polymeric membrane separation of organic components from aqueous solution feedstreams. Yet in another aspect the invention relates to a process for the hydrophobic, polymeric membrane separation of organic components from aqueous solution feedstreams in combination with a solution sink which provides the lower chemical potential on the permeate side of the membrane. Still another aspect of the invention relates to a process for the removal of environmental contaminants such as organic components from waste water streams.

The separation of organic components from aqueous mixtures such as dispersions, emulsions, solutions, and the like has been accomplished by various means, for example, distillation, filtration, solvent extraction and a combination of these and other methods. However, these methods often fail to provide satisfactory separation of the organic components from the aqueous solutions without the utilization of multiple unit apparatus or the high energy input required by phase change techniques. Solvent extraction methods frequently result in exchange of one solution of organics for another thus presenting the continuing need for the separation of organic components from aqueous solutions. Because of the disadvantage of the existing method for the separation of organic components from aqueous solutions, a simple, inexpensive process adaptable for all types of aqueous solutions is highly desirable.

Membrane separation techniques have been utilized to separate mixtures of two or more different molecules, for example, aqueous mixtures, mixed hydrocarbons, azeotropic mixtures, and the like. However, known separation techniques utilized in the separation of aqueous mixtures frequently are followed by secondary procedures such as distillation. Because of the disadvantage of the existing separation methods which principally involve a substantial energy input of a thermal, chemical, or mechanical nature, a simple membrane separation for separating neutral organic components from aqueous solutions is needed.

The growing need for additional sources of water from salt water or from contaminated sources has directed intensive investigations into the separation of water from aqueous mixtures. Substantial improvements have been made in known water separation procedures based on flash evaporation, membrane separation, electrodialytic action, freezing and the like. However, paralleling such needs for additional sources of water is the need for improved recovery procedures concerning organic components contained in aqueous waste streams. In order to achieve an inexpensive separation of organic components from aqueous solutions, techniques must be developed which require minimum equipment and energy input.

Accordingly an object of this invention is to provide the separation of organic components from aqueous streams utilizing hydrophobic polymeric membrane systems. Another object of this invention is to provide hydrophobic membrane pervaporization, liquid-liquid dialysis, or gas to gas separation of organic components from aqueous solutions wherein the process is as quantitative as possible.

SUMMARY OF THE INVENTION

It has been discovered in accordance with the present invention that neutral organic components are effectively separated from aqueous solutions through polymeric membranes which are selectively permeable to the neutral organic components. The effective separation system utilizes a lower chemical potential on the permeate side of the membrane than on the feed side of the membrane through chemical and/or physical means. One essential feature of the invention requires that the polymeric membrane be hydrophobic and selectively permeable to the neutral organic components of the aqueous solution. The process according to the invention separates neutral organic components from aqueous solutions through the steps of (a) contacting an aqueous solution of neutral organics feed stream with a first surface of a hydrophobic, polymeric membrane permeable to the neutral organic components; (b) maintaining a second and opposite membrane surface at a lower chemical potential than the first membrane surface for said neutral organic components; (c) permeating a portion of the neutral organic components into and through the membrane; and (d) withdrawing at the second membrane surface a mixture having a higher total concentration of neutral organic components than in the aqueous solution feed stream. The lower chemical potential on the permeate side of the membrane can be maintained by vacuum conditions or at least a pressure differential when pervaporization or gas to gas separation systems are required; however when liquid to liquid dialysis systems are required, an optional feature of the invention is the utilization of a solution sink such as chemical means for maintaining the lower chemical potential. The solution sink can be selected from potential solvents for the neutral organic components and/or complexing solutions.

DETAILED DESCRIPTION OF THE INVENTION

The process of the instant invention comprises utilization of hydrophobic, polymeric membranes which are selectively permeable to neutral organic components contained in aqueous solutions and which are substantially impermeable to other components of an aqueous solution, or materials utilized in the solution sink such as complexing solutions or solvents for the neutral organic components which are in contact with the membrane. The process according to the invention can utilize neutral organic component solvent complexing solution, or vacuum vapor mode on the permeate side of the membrane for maintaining the lower chemical potential which is an essential feature of the invention. The lower chemical potential provides a force which drives the neutral organics permeate through the selective, hydrophobic polymeric membrane, and can result from the solution sink solvent, complexing solution, or vapor vacuum mode having capacity for neutral organics permeate. Multi-stage operations are feasible as scale-up utilization of the invention since individual stages permit various concentrations and temperatures in order to achieve optimum driving forces.

Continuous processing according to the invention is achievable wherein an aqueous solution feedstream containing neutral organic components is passed on one side and in contact with a hydrophobic, polymeric membrane having selectivity for the neutral organic components, while a solution sink or vapor vacuum is in contact with the permeate side of the membrane. The lower chemical potential of, for example, the neutral organic component solution sink together with counter current relationship of the neutral organic aqueous solution feedstream, provides driving force for permeating neutral organics through these selective membranes into the neutral organic solution sink. The neutral organic enriched solution sink or vapor can be swept or moved by physical means to suitable processing which promotes the recycling of the solvents or complexing solutions.

For each individual stage the effectiveness of the separation is shown by the separation factor (S.F.). The separation factor (S.F.) is defined as the ratio of the concentration of two substances, A and B, to be separated, divided into the ratio of the concentrations of the corresponding substances in the permeate $$S.F. = \frac{(C_a/C_b) \text{ in permeate}}{(C_a C_b) \text{ in permeant}}$$

where $C_a$ and $C_b$ are the concentration of the preferentially permeable component and any other component of the mixture or the sum of other components respectively.

In the pervaporization or vapor vacuum embodiment of the invention, the first or feed side of the membrane is usually under a positive pressure, while the second side is under a negative pressure, relative to atmospheric pressure. Another preferred mode of the pervaporization separation is where the second side of the membrane is maintained at a vacuum of 0.2 mm to about 759 mm of mercury.

The term "chemical potential" is employed herein as described by Olaf A. Hougen and K. M. Watson ("Chemical Process Principles, Part II," John Wiley, New York, 1947). The term is related to the escaping tendency of a substance from any particular phase. For an ideal vapor or gas, this escaping tendency is equal to the partial pressure so that it varies greatly with changes in the total pressure. For a liquid, change in escaping tendency as a function of total pressure is small. The escaping tendency of a liquid always depends upon the temperature and concentration. In the present invention the feed substance is typically a liquid solution and the permeate side of the membrane is maintained such that a vapor or liquid phase exists. A vapor feed may be employed when the mixture to be separated is available in that form from an industrial process or when heat economies are to be effected in multi-stage.

In one embodiment of this inventive process, the first or feed surface of the hydrophobic, polymeric membrane is contacted with an aqueous solution containing neutral organic components in the liquid phase, while the second surface of the membrane is contacted with a neutral organic solvent or complexing agent solution. However, the aqueous solution feedstream can be in the vapor phase wherein it is preferable that the feed side of the membrane be under positive pressure in relationship to the permeate side. In order for permeation of the neutral organic components to occur, there must be a chemical potential gradient between the two zones, i.e. the feed side of the membrane as compared to the permeate side of the membrane. The chemical potential gradient for the purposes of this invention requires a chemical potential of the feed zone be higher than the chemical potential in the permeate zone. Under such conditions a portion of the neutral organics in the aqueous solution feedstream will dissolve within the membrane and permeate therethrough since an essential feature of the invention is that the hydrophobic, polymeric membrane be selectively permeable to the neutral organic components of the aqueous solution.

The permeation step according to the invention is conducted by contacting the neutral organic aqueous solution feedstream in either the liquid or vapor phase with the hydrophobic, polymeric membrane and recovering a neutral organics enriched permeate fraction from the other side of the membrane. The permeate can be either in the form of a neutral organics vapor, solution, or complexing solution of the neutral organics. To facilitate rapid permeation of the neutral organics, the chemical potential of the permeated neutral organics at the surface of the membrane from the permeate side can be kept at a relatively low level through the rapid removal of the permeate fraction, for example, through a continuous process wherein the neutral organics enriched vapor, solution, or complex solution is continuously removed and replaced by a vacuum or non-enriched neutral organic solvent and/or complexing agent.

The term "solution sink" for the purposes of this invention defines a liquid sweep utilized on the permeate side of the membrane and is inclusive of both selective solvents for neutral organic components and solutions of neutral organic component complexing agents, or both. Suitable selective solvents for neutral organics used as solution sink can be selected from solvents which permit the total concentration of the neutral organic to be greater on the permeate side than on the feed or permeant side of the membrane. The term "neutral organics" for the purpose of this invention will be defined as those organics which have neither acid or basic characteristics. "Organic compounds" being defined as those compounds which generally consist of carbon and hydrogen with or without oxygen, or other elements, except those in which carbon plays no important part, e.g., carbonates; therefore the term "neutral organic components" is defined as those components or compounds which generally consist of carbon and hydrogen, with or without oxygen, nitrogen, or other elements except those in which carbon plays no important part, and which are characterized as neither acid nor basic.

Hydrophobic, polymeric membranes as used in the inventive process are non-porous, that is free from holes and tears and the like, which destroy the continuity of the membrane surface. Useful hydrophobic membranes according to the invention are comprised of polymeric materials. The membranes are preferably as thin as possible while permitting sufficient strength and stability for use in the permeation process. Generally separation membranes from about 0.1 to about 15 mils or somewhat more are utilized according to the invention. High rates of permeation can be obtained by the use of thinner membranes which can be supported with structures such as fine mesh wire, screens, porous metals, porous polymers, and ceramic materials. The hydrophobic membrane may be a simple disk or a sheet of the membrane substance which is suitably mounted in a duct or pipe or mounted in a plate or frame filter press. Other forms of membrane may also be employed such as hollow tubes or fibers through or around which the feed is applied or is recirculated with the permeate being removed from the other side of the tube as a neutral organics enriched sweep solution, complex or enriched gas stream. There are other useful shapes and sizes which are adaptable to commercial installations, which are in accordance with the invention. The polymeric membrane compositions may be linear, cross-linked, grafted, and vary over a wide range of molecular weights. Also suitable according to the invention are copolymers and polymeric blends. The hydrophobic membranes, of course, must be stable and insoluble in the aqueous feed solution and the various sweep liquid solvents and complexing agents. Membrane insolubility as used herein is taken to include that the membrane material is not substantially soluble or sufficiently weakened by its presence in the sweep solvent or aqueous feed solution to impart rubbery characteristics which can cause creep or rupture resulting from conditions of use, including use pressure. The hydrophobic membranes may be polymers which have been polymerized or treated so that specific end groups are present in the polymeric material. The hydrophobic membranes utilized according to the inventive process may be prepared by any suitable means such as, for example, casting of film or spinning of hollow fibers from a "dope" containing polymer in solvent. Such preparations are well-known in the art. An important control of the separation capacity of particular hydrophobic, polymeric membrane is exercised by the method used to form and solidify the membrane, e.g., casting from a melt into control atmosphere or solution and various concentrations and temperatures. The art of membrane use is known with substantial literature being available on membrane support, fluid flow and the like. The present invention is practiced with such conventional apparatus. The membrane must of course, be sufficiently thin to permit permeation as desired but sufficiently thick so as not to rupture under operating conditions. The membrane according to the invention must be selectively permeable to the neutral organic components contained in the aqueous solution in comparison to the other components of the aqueous solution feedstream and the take-up solutions and complexing agents on the permeate side of the membrane when utilized.

The following exemplary hydrophobic polymeric membranes are suitable according to the process of the invention and are selectively permeable to neutral organics contained in aqueous solution:

Polyolefins such as polybutadiene, polyethylene, polyisoprene, and copolymers thereof such as copolymers ethylene and vinylacetate, ethylene and acrylic acid, and the like; fluorinated polyolefins such as polyvinylfluoride, polyvinylidenefluoride, and copolymers such as polyvinylidenefluoride and polyvinylpyrrolidone, ethylene and tetrafluoroethylene, fluorinated ethylene and polyethylene and the like; silicone polymers and resins such as methyl silicone polymeric resin, methyl/phenyl silicone resin, and the like; polyurethanes; and under certain specified conditions aliphatic nylons.

The aqueous solution containing the neutral organic components may be continuously or intermittently introduced into the hydrophobic, polymeric feed zone. The permeated neutral organics are removed from the opposite side of the membrane in batch or continuous manner through the use of various sweep forms, vapor, complexing solutions or solvent sink. The rate of introduction of the aqueous solvent feedstream and the removal of the permeate fraction may be adjusted to provide the desired proportions of permeate and permeant fraction. A number of permeation stages may be employed where the permeate and permeant fractions may be recycled to various stages. In each permeation zone the membrane may be used in the form of sheets, tubes, hollow fibers, or other structures which preferentially provide a maximum amount of membrane surface while utilizing a minimum volume of space.

The absolute pressure of the feed and the permeant zones may vary considerably. Pressures range from a few millimeters of mercury to as high as 500 to 1,000 psig or higher according to the invention depending upon the strength of the membrane and the separation requirement, i.e., a vapor or a liquid system or a combination liquid vapor system. When the permeate zone is under the liquid phase conditions, pressure is generally not an important factor. However, when gas or vapor feed mixtures or pervaporization conditions are utilized, higher pressures on the feed zone can result in greater chemical potential and is desirable.

The membrane permeation step is preferably operated under conditions of temperature which can vary over a wide range from about $-20°$ C. to about $200°$ L C. or more depending upon the neutral organic components of interest, aqueous solutions, solution sink, or pervaporization mode and the thermal condition of the aqueous solution. Higher operating temperatures are frequently desirable because of the increased rates of permeation; however, the present invention is also concerned with energy input efficiency and minimum temperature change for the purpose of separating neutral organics from aqueous solutions.

To illustrate further the present invention and the advantages obtained therefrom, the following examples are given without limiting the invention thereto. It is also possible that many changes in the details can be made without departing from the spirit of the invention.

EXAMPLES 1-14

Neutral organic components were removed from aqueous solutions utilizing membranes which are selectively permeable to the organics under liquid to gas separation conditions. The following Table 1 presents the results achieved according to specific embodiments of the invention including separating methanol, ethanol, butanol, ethylbenzene, acetonitrile, and acrylonitrile through olefinic polymeric membranes. These olefinic polymeric membranes include copolymers as well as blends wherein the copolymers or blends were substantially comprised by weight of the polymeric olefins. Examples 1-14 utilize in combination with the hydrophobic olefinic polymeric membranes, a chemical potential gradient resulting from pervaporization conditions. Conditions such as feed concentration, temperature, rate, and separation factor for the various membranes and neutral organic components are presented in the following Table 1.

TABLE 1

Pervaporization (<0.1 mm Hg on permeate side and 1 atmosphere on the feed side)

| Example Number | Membrane | Feed | Temperature °C. | Rate (grams/hr −11 cm$^2$) | Membrane thickness (mils) | Separation Factor (water/organic) |
|---|---|---|---|---|---|---|
| 1 | Poly (butadiene) | 50% by wt methanol | 25 | 0.007 | 6 | 0.33 |
| 2 | Poly (butadiene) | 50% by wt ethanol | 25 | 0.01 | 6 | 0.35 |
| 3 | Poly (ethylene) | 50% by wt ethanol | 70 | 0.017 | 2 | 0.80 |
| 4 | Poly (ethylene) | 7% by wt butanol | 70 | 0.020 | 2 | 0.073 |
| 5 | Poly (butadiene) | 7% by wt butanol | 25 | 0.014 | 6 | 0.020 |
| 6 | Copoly (ethylene/vinyl acetate) (65% by wt ethylene) | 7% by wt butanol | 70 | 0.056 | 4 | 0.028 |
| 7 | Copoly (ethylene/vinyl acetate) (88% by wt ethylene) | 7% by wt butanol | 70 | 0.035 | 5 | 0.023 |
| 8 | Poly (ethylene) | 5% by wt acrylonitrile 0.1% by wt acetonitrile 0.002% by wt propionitrile | 50 | 0.0199 | 2 | 0.105 |
| 9 | Copoly (ethylene/acrylic acid) (97% - molar ethylene) | 5% by wt acrylonitrile 0.1% by wt acetonitrile 0.002% by wt propionitrile | 50 | 0.0036 | 4 | 0.081 |
| 10 | Copoly (ethylene/vinyl acetate) (65% by wt ethylene) | 5% by wt acrylonitrile 0.1% by wt acetonitrile 0.002% by wt propionitrile | 50 | 0.089 | 4 | 0.049 |
| 11 | Poly (isoprene) | 50% by wt acetonitrile | 50 | 0.0310 | 11 | 0.107 |
| 12 | Poly (ethylene) | 50% by wt acetonitrile | 50 | 0.029 | 1 | 0.13 |
| 13 | Poly (ethylene) | 150 ppm ethylbenzene | 20 | — | 1 | $<10^{-3}$ |
| 14 | Poly (ethylene) | 100 ppm ethylbenzene | 70 | — | 1 | $<10^{-3}$ |

EXAMPLE 15

A neutral organic component (ethanol) was removed from aqueous solution utilizing a copolymer membrane comprised of 65% by weight ethylene polymer and 35% by weight vinylacetate polymer. A feedstream comprised of 90% by weight ethanol/10% by weight water was contacted with a 3 mil thick membrane for a period of 72 hours resulting in a total flux of $272 \times 10^{-4}$ grams/hr-11 cm$^2$.

A liquid sweep stream of ethylene glycol was utilized in the liquid to liquid separation system; however the final sump was comprised of 80% by weight ethanol and 20% by weight water. The system had a separation factor for water over ethanol of 2.0 and is not according to the invention due to the membrane swelling caused by the high concentration of ethanol in the feedstream.

The example was repeated utilizing the same membranes (4 mils vs. 3 mils thickness) and a feedstream comprised of 10% by weight ethanol and 90% by weight water for a period of 93 hours. A rate of $36 \times 10^{-4}$ gram/hr-11 cm$^2$ was achieved resulting in a final sump concentration of 25% by weight ethanol and 75% by weight water; thus the system was in accordance with the invention having a separation factor for water compared to ethanol of 0.25. No visible swelling of the membrane was observed as in the prior case.

EXAMPLES 16-20

Neutral organic components were removed from aqueous solutions utilizing membranes which are selectively permeable to the organics under liquid to gas separation conditions. The following Table 2 presents the results achieved according to specific embodiments of the invention including separation of acrylonitrile from the aqueous solution through fluorinated olefinic polymeric membranes. These fluorinated olefinic polymeric membranes include copolymers as well as blends. Examples 16-20 utilize in combination with the hydrophobic, fluorinated olefinic polymeric membranes, a chemical potential gradient resulting from pervaporization conditions. Conditions such as concentration, temperature, rate, and separation factors for the various membranes and neutral organic component-aqueous solutions are presented in the following Table 2.

TABLE 2

Pervaporization (1 atmosphere pressure on feed side and <0.1 mm Hg on the permeate side)

| Example Number | Membrane | Feed | Temperature °C. | Rate (grams/hr −11 cm$^2$) | Membrane thickness (mils) | Separation Factor (water/organic) |
|---|---|---|---|---|---|---|
| 16 | Blend 90% by wt poly (vinylidene fluoride) 10% by wt poly (vinyl- pyrrolidone) | 5% by wt acrylonitrile 0.1% by wt acetonitrile 0.002% by wt propionitrile | 50 | 0.150 | 1 | 0.18 |
| 17 | Copoly (ethylene/ tetrafluoro- ethylene) (45/55 molar ratio) | 5% by wt acrylonitrile 0.1% by wt acetonitrile 0.002% by wt propionitrile | 50 | 0.0054 | 1 | 0.55 |
| 18 | Poly (vinylidene fluoride) | 50% by wt acetonitrile | 50 | 0.453 | 1 | 0.300 |
| 19 | Poly (vinyl- fluoride) | 50% by wt acetonitrile | 50 | 1.091 | 1 | 0.613 |
| 20 | Fluorinated ethylene/propylene copolymer | 50% by wt acetonitrile | 50 | 0.0032 | 1 | 0.70 |

EXAMPLES 21-30 ganic components are presented in the following Table 3.

TABLE 3

Pervaporization (1 atmosphere pressure on feed side and <0.1 mm Hg on permeate side

| Example Number | Membrane | Feed | Temperature °C. | Rate (grams/hr −11 cm$^2$) | Membrane thickness (mils) | Factor (water/organic) |
|---|---|---|---|---|---|---|
| 21 | Silicone/poly- carbonate block copolymer | 50% by wt methanol | 25 | 0.16 | 1 | .218 |
| 22 | Methylsilicone/ phenylsilicone copolymer | 50% by wt methanol | 60 | 0.016 | 17 | 0.80 |
| 23 | Methylsilicone polymer | 50% by wt methanol | 25 | 0.19 | 10 | 0.094 |
| 24 | Methylsilicone polymer | 50% by wt ethanol | 25 | 0.16 | 10 | 0.20 |
| 25 | Dow silastic RTV 585 | 50% by wt ethanol | 25 | 0.09 | 4 | 0.10 |
| 26 | Silicone/poly- carbonate block copolymer | 7% by wt butanol | 25 | 0.085 | 1 | 0.066 |
| 27 | Methylsilicone/ phenylsilicone copolymer | 7% by wt butanol | 60 | 0.0167 | 17 | 0.211 |
| 28 | Methylsilicone polymer | 7% by wt butanol | 25 | 0.11 | 10 | 0.049 |
| 29 | Methylsilicone polymer | 5% by wt acrylonitrile 0.1% by wt acetonitrile 0.002% by wt propionitrile | 50 | 0.11 | 10 | 0.029 |
| 30 | Methylsilicone polymer | 50% by wt acetonitrile | 50 | 0.25 | 15 | 0.095 |

Neutral organic components were removed from aqueous solutions utilizing membranes which are selectively permeable to the organics under liquid to gas separation conditions. The following Table 3 presents the results achieved according to the specific embodiments of the invention including separation of ethanol, butanol, acrylonitrile, and acetonitrile through polymeric silicones and copolymers thereof. Examples 21-30 utilize in combination with the hydrophobic polymeric silicone membranes, a chemical potential gradient resulting from pervaporization conditions. Conditions such as concentration, temperature, rate, separation factor for the various membranes and neutral or-

EXAMPLE 31

A neutral organic component (ethanol) was removed from aqueous solution comprised of 90% ethanol and 10% water by weight utilizing a methyl silicone resin having a thickness of 13 mils. A rate of 670 grams/hr-11 cm$^2 \times 10^{-4}$ was achieved at a temperature of 23° C. utilizing ethylene glycol as a solution sweep fluid. The aqueous solution feedstream was contacted with membrane for a period of 22 hours and resulted in a sump content of 92% by weight ethanol vs. 8% by weight water in addition to the ethylene glycol. The system separation factor for water over ethanol was 0.26. The process was repeated utilizing a 10% by weight ethanol and 90% by weight water aqueous solution feedstream with the results of a rate of $260 \times 10^{-4}$ gram/hr-11 cm$^2$ and a separation factor for water over ethanol of 0.10. The content of the ethylene glycol included 43% by weight ethanol and 57% by weight water in addition to the ethylene glycol.

EXAMPLE 32

A neutral organic component (ethanol) was removed from aqueous solution wherein the solution was commmprised of 90% by weight ethanol and 10% by weight water at 22° C. by contacting said solution with a Dow-Corning silicone product (RTV 585 Silastic) (18 mils thick). The separation system resulted in a rate of $420 \times 10^{-4}$ gram/hr-11 cm$^2$. Ethylene glycol was utilized as a solution sink and the separation factor for water over ethanol was 0.44.

The process was repeated utilizing an aqueous solution feedstream comprised of 10% by weight ethanol and 90% by weight water which resulted in a rate of $50 \times 10^{-4}$ gram/hr-11 cm$^2$ and a separation factor for water over ethanol of 0.05. The solution sink was comprised of 49% by weight ethanol and 51% by weight water in addition to the ethylene glycol. The total time for both separation procedures was 22 hrs.

EXAMPLE 33

A neutral organic component (ethanol) was removed from an aqueous solution feedstream comprised of 10% by weight ethanol and 90% by weight water through utilization of a methyl silicone resin having a thickness of about 13 mils at a temperature of 25° C. A sweep fluid comprised of meta-xylene was utilized resulting in a sump concentration of 91% by weight ethanol and 9% by weight water in addition to the meta-xylene. The system achieved a separation factor for water over ethanol of less than 0.01.

EXAMPLE 34

An aqueous solution feedstream comprised of 5.3% acrylonitrile, 0.1% acetonitrile and 0.002% by weight propionitrile was contacted with a urethene member having a thickness of 1 mil under pervaporization conditions of 50° C. The permeate side had less than 0.1 millimeters mercury vaccum condition with the separation resulting in a rate of 0.156 grams/hour-11 cm$^2$ and a separation factor for water over acrylonitrile of 0.071.

EXAMPLE 35

According to the invention aliphatic nylon 66 and aliphatic nylon 12 were utilized to separate butanol from water under pervaporization conditions. However, ethanol, methanol, acrylonitrile and acetonitrile were not selectively separated through these membranes from water. As a result of these successes and failures it was analyzed that neutral organic components having at least about 4 carbon atoms per molecule could be utilized as an aqueous solution feedstream which would be successfully separated according to the invention through aliphatic nylons.

An aqueous feedstream comprised of 7% by weight butanol was contacted with nylon 66 at 25° C. resulting in a rate of 0.087 gram/hr-11 cm$^2$ and a separation factor for water over butanol of 0.73. The same feedstream was contacted with nylon 12 at 75° C. resulting in a rate of 0.026 gram/hr-11 cm$^2$ and a separation factor for water over butanol of 0.13.

What is claimed is:

1. A process for separating neutral organics from an aqueous solution which comprises contacting an aqueous solution containing neutral organics having at least four carbon atoms per molecule selected from alkanols, organic nitriles and alkyl benzenes with a first surface of a hydrophobic polymeric membrane selected from polysilicones and polyurethanes selectively permeable to the neutral organic components contained in the aqueous solution; maintaining a second and opposite membrane surface at a lower chemical potential than the first membrane surface for the neutral organic components; permeating a portion of said neutral organic components into and through the membrane; and withdrawing at the second membrane surface a mixture having a higher total concentration of the neutral organic components than the total concentration of said neutral organic components in the aqueous solution contacting said first surface.

2. The process of claim 1 characterized in that both the aqueous solution permeant and the permeate mixture are in the vapor phase.

3. The process of claim 1 wherein the lower chemical potential is maintained on the second membrane surface by contacting the second membrane surface with a neutral organics solution sink.

4. The process of claim 1 or 3 wherein the neutral organics are alkanols.

5. The process of claim 4 wherein the neutral organics are butanol.

6. The process of claim 1 or 3 wherein the neutral organics are organic nitriles.

7. The process of claim 1 or 3 wherein the neutral organics are alkylbenzenes.

8. The process of claim 1 wherein the neutral organics mixture withdrawn from the second membrane surface is in the vapor phase.

9. The process of claim 1 wherein the neutral organics mixture withdrawn from the second membrane surface is in the liquid phase.

* * * * *